US006747688B1

(12) United States Patent
Kang

(10) Patent No.: US 6,747,688 B1
(45) Date of Patent: Jun. 8, 2004

(54) APPARATUS AND METHOD FOR REPRODUCING REAL COLORS IN A VIDEO SYSTEM

(75) Inventor: Ho-Woong Kang, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 521 days.

(21) Appl. No.: 09/721,946

(22) Filed: Nov. 27, 2000

(30) Foreign Application Priority Data

Jun. 21, 2000 (KR) ........................................ 2000-34131

(51) Int. Cl.$^7$ ............................................. H04N 17/02
(52) U.S. Cl. ........................ 348/182; 348/184; 348/569
(58) Field of Search ................................ 348/180, 184, 348/187, 189, 569, 588, 182, 190, 630, 649

(56) References Cited

U.S. PATENT DOCUMENTS

| 5,115,229 | A | * | 5/1992 | Shalit .......................... 340/716 |
| 5,754,222 | A | * | 5/1998 | Daly et al. ................... 348/184 |
| 6,008,836 | A | * | 12/1999 | Bruck et al. .................... 348/6 |
| 6,269,482 | B1 | * | 7/2001 | Gershfeld ..................... 725/107 |
| 6,320,668 | B1 | * | 11/2001 | Kim ............................. 358/1.1 |
| 6,326,996 | B1 | * | 12/2001 | Brabander ................... 348/189 |

* cited by examiner

Primary Examiner—Victor R. Kostak
(74) Attorney, Agent, or Firm—Robert E. Bushnell, Esq.

(57) ABSTRACT

The present invention relates to an apparatus and a method for reproducing real colors of a video system. The apparatus comprises a video signal generating device for storing, in an internal memory, a first test video signal in which inherent RGB color sensitivity information thereof is included; and a video signal display device for storing, in an internal memory, a second test video signal in which inherent RGB color sensitivity information thereof is included. The video signal device synthesizes the first test video signal from the video signal generating device and the second test video signal read from the internal memory based on a request from a user for display on a screen, adjusts an amplitude degree of the first test video signal until color sensitivity of the first test video signal matches color sensitivity of the second test video signal, and amplifies all video signals from the video signal generating device based on the adjusted amplitude degree for display on the screen. As a result, the real colors of images displayed on the screen can be reproduced in carrying out electronic commerce business or in performing design jobs which require precision by exactly compensating for various color distortions which can be generated prior to a video signal, outputted from the video signal generating device, being finally displayed on the screen of the video signal display device.

19 Claims, 8 Drawing Sheets

APPARATUS AND METHOD FOR REPRODUCING REAL COLORS IN A VIDEO SYSTEM

This application makes reference to, and claims all benefits accruing under 35 U.S.C. §119 from an application entitled METHOD AND APPARATUS FOR PLAYING A REAL COLOR IN A VIDEO SYSTEM filed with the Korean Industrial Property Office on Jun. 21, 2000 and there duly assigned Ser. No. 34131/2000.

BACKGROUND OF THE INVENTION

1. Technical Field

The present invention relates to an apparatus and a method for reproducing real colors in a video system and, more particularly, to an apparatus and a method for reproducing real colors in a video system which is capable of reproducing real colors on a screen by compensating various distortions of colors which can be generated until a video signal is displayed on the screen.

2. Related Art

In general, a cathode ray tube (CRT) used for a video display device employs a principle of emitting light of different brightness and colors by striking red, green, and blue fluorescent materials coated on the surface of the cathode ray tube with electron beams of different amounts according to the intensity of a video signal. Such CRTs are widely used thanks to their price and excellent display performance.

However, such display devices do have problems relating to the inability of the user to adjust with accuracy the colors (e.g., red, green and blue) of the images displayed as a part of the on-screen display (OSD) function. In general, this is due to the fact that color adjustment. parameter of an OSD circuit are set when the OSD circuit is manufactured so that it is not possible for the user to make proper color adjustments to the OSD.

The above problem is especially of concern when it is considered that display devices are typically not capable of adjusting colors into real colors. Moreover, there is a further problem in that distortion of colors of video signals can be introduced whenever such signals are transmitted between a video signal generating device and a display device.

SUMMARY OF THE INVENTION

In order to solve the above problems of the prior art, it is an object of the present invention to provide an apparatus and a method for reproducing real colors in a video system, capable of reproducing the real colors on a screen by exactly compensating various color distortions which can be generated until a video signal is finally displayed on the screen.

In order to achieve the above object, the apparatus according to the present invention comprises: a video signal generating device for storing, in an internal memory, a first test video signal in which inherent RGB color sensitivity information thereof is included; and a video signal display device for storing, in an internal memory, a second test video signal in which inherent RGB color sensitivity information thereof is included, for synthesizing the first test video signal inputted from the video signal generating device and the second test video signal read from the internal memory based on a request of a user for a display on a screen, for adjusting an amplitude degree of the first test video signal until color sensitivity of the first test video signal is matched to color sensitivity of the second test video signal, and for amplifying all video signals inputted from the video signal generating device based on the adjusted amplitude degree for display on the screen.

In order to achieve the above object, in a video system having a video signal display device for amplifying a certain video signal inputted from a video signal generating unit for display on a screen based on a set amplitude degree, a method for reproducing real colors of the video system comprises the steps of: outputting a control command if the video signal display device receives an input of the menu key by a user; outputting, to the video signal display device, a first test video signal in which inherent RGB color sensitivity information of the video signal display device is included, based on the latter control command; reading, from an internal memory, a second test video signal in which inherent RGB color sensitivity information of the video signal display device is included, based on the above control command; synthesizing the first test video signal inputted and the second test video signal for display on a screen in the video signal display device; adjusting an amplitude degree with an input of an up/down key if the up/down key is operated by a user in the display state of the video signal display device; and amplifying all video signals inputted from the video signal generating device for display on the screen based on the adjusted amplitude degree of the video signal display device.

In order to achieve the above object, another apparatus according to the present invention comprises: a photographing device for detecting an RGB color sensitivity from a photographed video signal, for producing a first test video signal based on the detected RGB color sensitivity, and for synthesizing the photographed video signal and the first test video signal to produce an output; and a video signal display device for storing, in an internal memory, a second test video signal in which inherent RGB color sensitivity information thereof is included, for synthesizing the first test video signal inputted from the photographing device and the second test video signal read from the internal memory for display on a screen based on a request of a user, for adjusting an amplitude degree of the first test video signal until the color sensitivity of the first test video signal is the same as that of the second test video signal, and for amplifying all video signals inputted from the photographing device based on the adjusted amplitude degree for display on the screen.

In order to achieve the above object, another method according to the present invention comprises the steps of: detecting an RGB color sensitivity from a photographed video signal; producing a first test video signal based on the detected RGB color sensitivity; synthesizing the photographed video signal and the first test video signal for storage frame by frame in a photographing device; converting the video signal inputted from the photographing device; transmitting the converted video signal to a public network through a transmitting antenna in a television transmitter; receiving the video signal from the public network through a receiving antenna; separating the photographed video signal and the first test video signal from the received video signal; amplifying the photographed video signal for display on the screen based on a set amplitude degree; storing the first test video signal in an internal memory in a video signal display device; when a menu key is operated by a user, reading a second test video signal in which inherent RGB color sensitivity information of the video signal display device is included; reading the first test video signal from an internal memory in the video signal display device; synthesizing the first test video signal and the second test video signal for display on the screen; when the up/down key is operated by the user, adjusting the amplitude degree based on the input of the up/down key in the latter display state; and amplifying all video signals received through the public network based on the adjusted amplitude degree for display on the screen in the video signal display device.

In order to achieve the above object, yet another method according to the present invention comprises the steps of: detecting an RGB color sensitivity from a photographed video signal; producing a first test video signal based on the detected RGB color sensitivity; synthesizing the photographed video signal and the first test video signal for storage, frame by frame, in a photographing device; connecting a user's computer to a web page of a main site through an internet; converting, in a main server, the video signal inputted from the photographing device for transmission to the user's computer through the internet; transmitting the video signal received through the internet to a video signal display device in the user's computer; receiving the video signal from the user's computer; separating the photographed video signal and the first test video signal from the received video signal; amplifying the photographed video signal for display on the screen based on a set amplitude degree; storing the first test video signal in an internal memory in the video signal display device; when a menu key is operated by a user, reading a second test video signal in which inherent RGB color sensitivity information of the video signal display device is included; reading the first test video signal from the internal memory in the video signal display device; synthesizing the first test video signal and the second test video signal for display on the screen; when the up/down key is operated by a user, adjusting the amplitude degree based on the input of the up/down key in the aforementioned display state; and amplifying all video signals received through the internet based on the adjusted amplitude degree for display on the screen in the video signal display device. Accordingly, by exactly compensating various color distortions which may be generated until a video signal outputted from a video signal generator or a photographing device is finally displayed on a screen of a video signal display device, the real colors of the images displayed on the screen can be reproduced when carrying out electronic commerce business or design jobs which require precision.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, first and second embodiments of the present invention will be described in detail with reference to the accompanying drawings.

Figure 1:
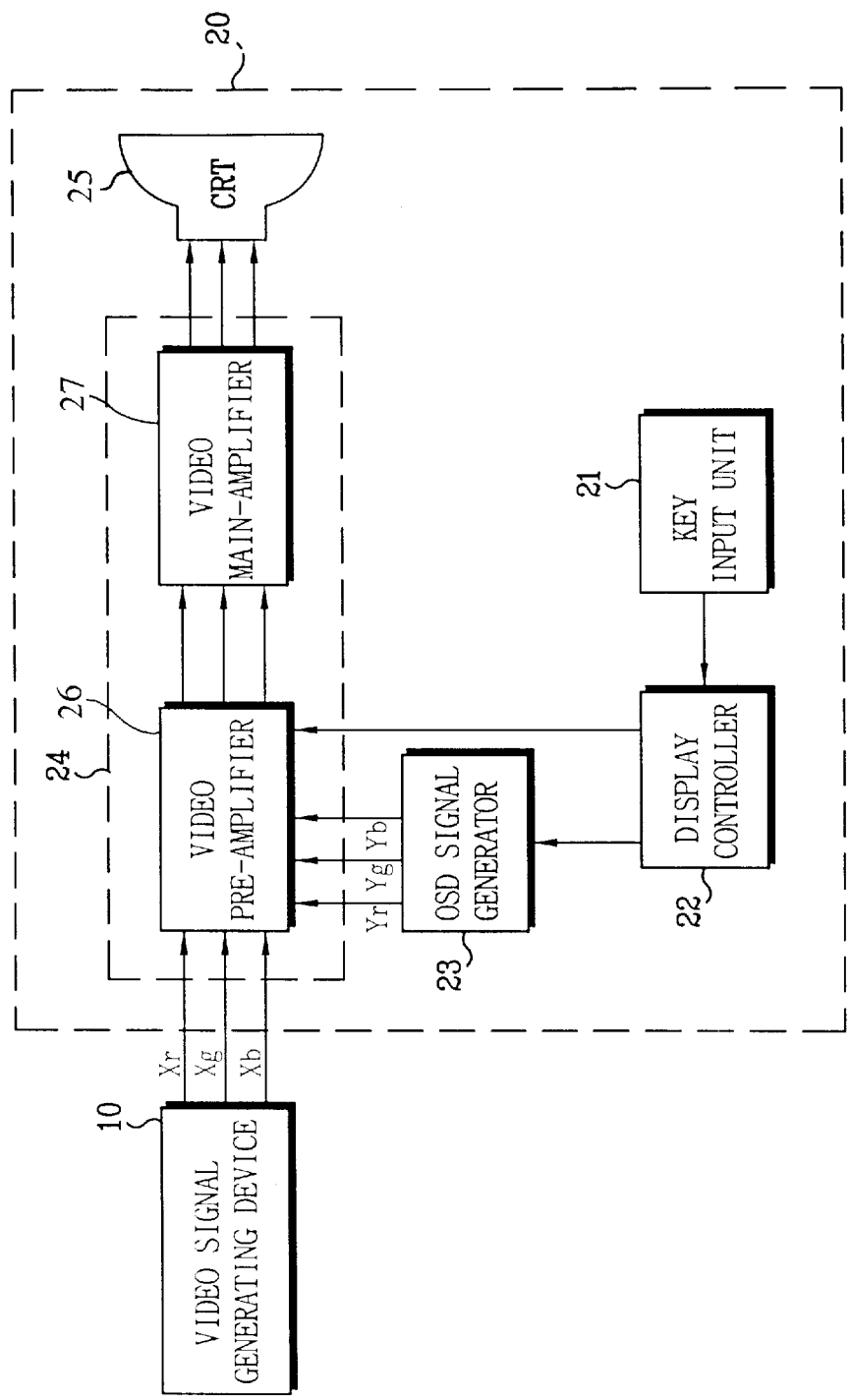
FIG. 1 is a block diagram schematically showing a video system.

FIG. 1 is a block diagram schematically showing a video system, which mainly comprises a video signal generating device 10 and a video signal display device 20.

When the video signal generating device 10 is a computer, an RGB video signal inputted to the video signal display device 20 from the device or computer 10 is amplified by a video signal processing unit 24 and then applied to a cathode terminal of a cathode ray tube 25 so as to be displayed on a screen.

At this time, the display controller 22 outputs, to the video signal processing unit 24, an amplitude degree optimum signal to be fitted to the characteristics of the video signal display device 20. Accordingly, the video signal processing unit 24 amplifies the RGB video signal with a constant amplitude degree, or a constant gain, to produce an output.

That is, the RGB video signal inputted from the device or computer 10 is a signal lower than 1 V in amplitude, so that it is amplified to about 30–50V through a video pre-amplifier 26 and a video main amplifier 27 of the video signal processing unit 24 in order to drive the cathode of the cathode ray tube 25.

At this time, a user can simply adjust an amplitude degree of an RGB video signal by using an On Screen Display (OSD) function.

The above OSD function is a function in which an OSD menu display stored in a ROM (not shown) is read and displayed on the cathode ray tube 25 of the video signal display device 20 when the user presses a menu key for a display adjustment (for example, an amplitude degree of an RGB video signal, a horizontal size, a vertical size, contrast, brightness, and so on), selects a particular menu with a selection key, and uses up and down keys to vary a setting value of a corresponding parameter.

For instance, when any of red, green and blue colors is selected by a user and an increment of a selected color is inputted with an up key, the display controller 22 increases the amplitude degree of the selected color by a certain amount, and transfers the increased amplitude degree to the video signal processing unit 24 for storage in a memory (not shown). Accordingly, the video signal processing unit 24 increases a magnitude of a video signal having the corresponding color by the increased amplitude degree.

That is, RGB color amplitude degrees of a video signal are set to optimum values in the manufacturing process of the video signal display device 20 before it leaves the factory, but a user can adjust the colors of an RGB video signal simply by using the OSD function whenever the user wants to adjust the amplitude degree of the RGB video signal after receiving the device 20 from the factory.

However, the amplitude degrees of RGB colors of an OSD signal are set when an OSD circuit is manufactured, so that it is impossible to control the amplitude degrees after the OSD circuit leaves the factory.

Therefore, video signal display device 20 does not allow a user to control color adjustments with respect to an OSD display, but does allow a user to control color adjustments with respect to a video display.

However, the video signal display device 20, as described above, allows a user to adjust the colors of a video display into the colors the user wants, but not into real colors, through a built-in program.

Further, since an output level of the video signal generating device 10, determined upon setting the amplitude degrees in the manufacturing process, does not match that of the video signal generating device 10 employed by the user, the user cannot know to what extent colors are distorted as a result of color distortion generated by inherent errors of the video signal generating device 10 or color distortion due to problems introduced during transmission of the video signals between the video signal generating device 10 and the video signal display device 20. Thus, it is almost impossible for the user to view images correctly by adjusting the colors into real colors.

Figure 2:
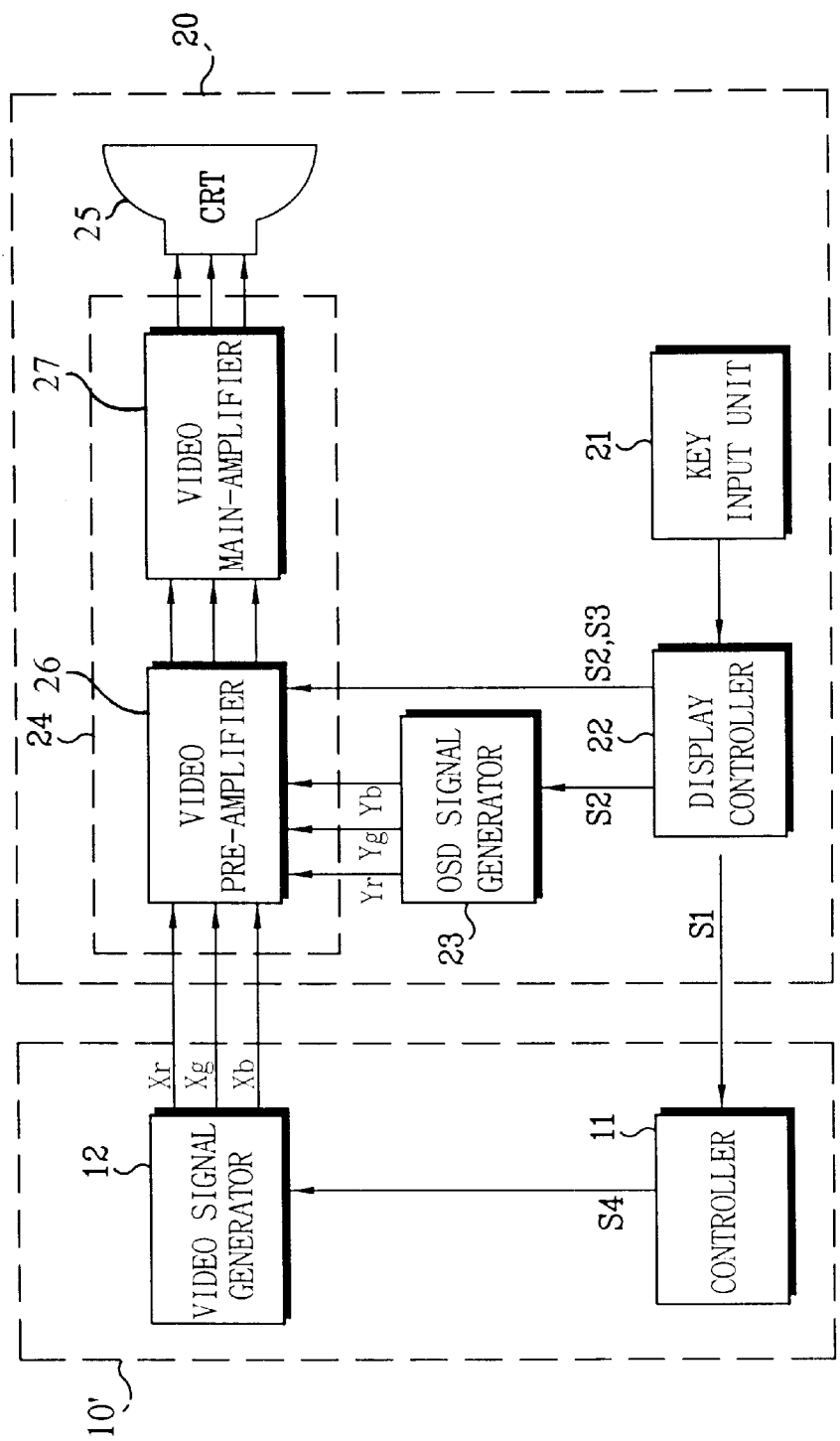
FIG. 2 is a block diagram showing an apparatus for reproducing real colors according to a first embodiment of the present invention.
Figure 3:
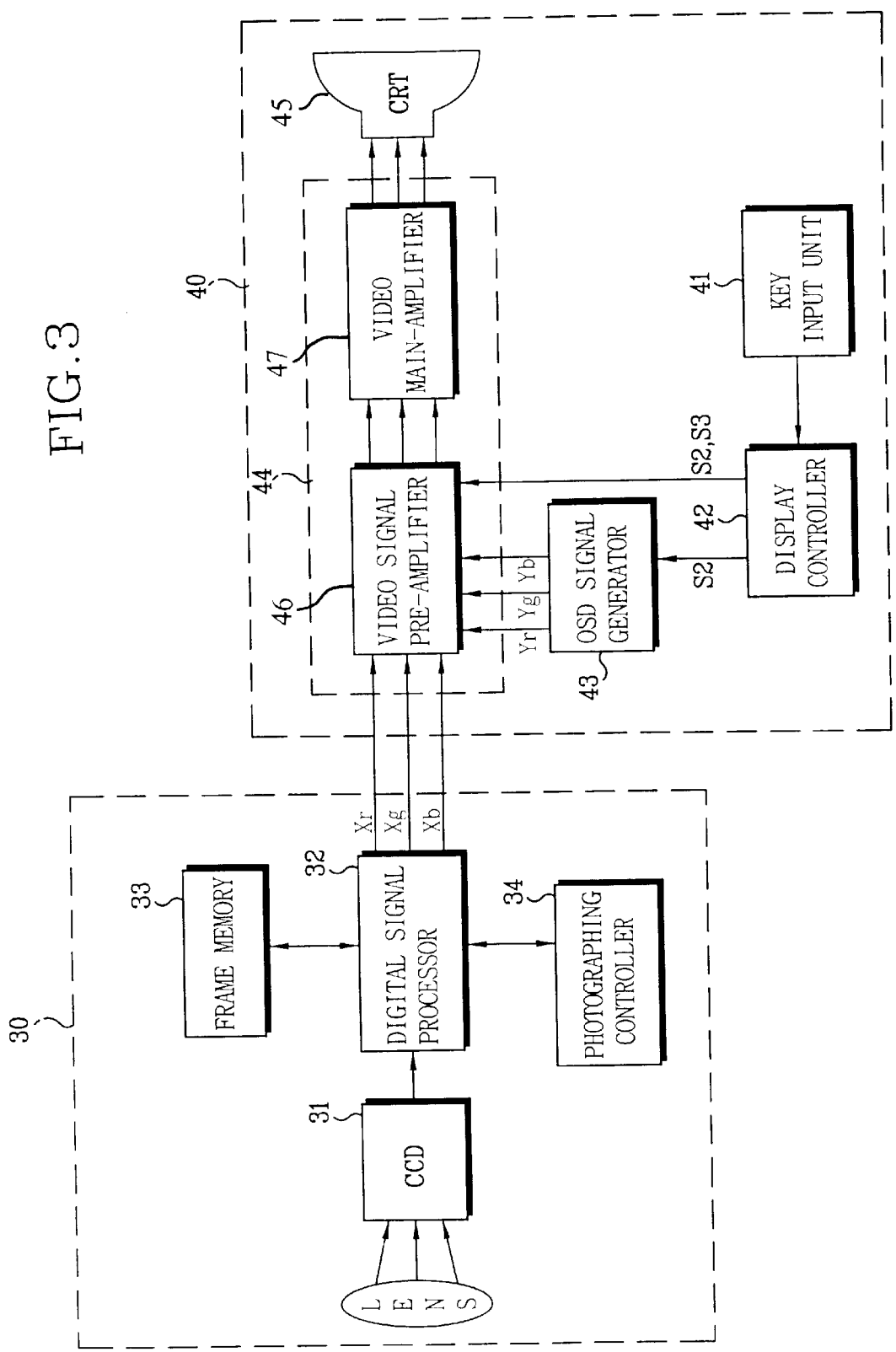
FIG. 3 is a block diagram showing an apparatus for reproducing real colors according to a second embodiment of the present invention.

FIG. 2 is a block diagram showing an apparatus for reproducing real colors according to a first embodiment of the present invention, and FIG. 3 is a block diagram showing an apparatus for reproducing real colors according to a second embodiment of the present invention.

As shown in FIG. 2, the first embodiment of the present invention is mainly composed of a video signal generating device 10' and a video signal display device 20.

The video signal generating device 10' includes a controller 11 for outputting a fourth control signal S4 based on a first control signal S1 inputted from the video signal display device 20; and a video signal generator 12 for outputting a certain video signal, for storing in an internal memory a first test video signal in which inherent RGB color sensitivity information of a device is included, and for outputting to the video signal display device 20 the first test video signal based on the fourth control signal S4.

Further, the video signal display device 20 includes: a key input unit 21 equipped with a menu key and an up/down key; a display controller 22 for outputting the first control signal S1, based on an input from the menu key, to the video signal generating device 10, for outputting a second control signal S2 to OSD signal generator 23 and to video signal processing unit 24, and for outputting a third control signal S3, based on an input from the up/down key, to the video signal processing unit 24; an OSD signal generator 23 for storing, in an internal memory, a second test video signal in which inherent RGB color sensitivity information is included, and for outputting the second test video signal, based on the second control signal S2, to the video signal processing unit 24; and a video signal processing unit 24 for synthesizing the first test video signal, inputted from the video signal generating device 10 based on the second control signal S2 and the second test video signal inputted from the OSD signal generator 23, for display on one screen, for controlling an amplitude degree based on the third control signal S3, and for amplifying all the video signals inputted from the video signal generating device 10 based on the controlled or adjusted amplitude degree to be displayed on the screen.

FIG. 3 is a block diagram showing an apparatus for reproducing real colors according to a second embodiment of the present invention. As shown in FIG. 3, the second embodiment of the present invention mainly comprises a photographing device 30 and a video signal display device 40.

The photographing device 30 includes: a charge coupled device(CCD) 31 for converting an optical signal of an object into an electric signal; a digital signal processor 32 for detecting an RGB color sensitivity from a video signal inputted from the CCD 31, for producing the first test video signal based on the detected RGB color sensitivity, for synthesizing the video signal from the first test video signal, and for carrying out digital signal processing; a frame memory for storing the digital-signal-processed video signal by frame unit; and a photographing controller 34 for controlling the entire system.

Further, the video signal display device 40 includes: a key input unit 41 equipped with a menu key and an up/down key; a display controller 42 for outputting the second control signal S2, based on an input from the menu key, to an OSD signal generator 43 and a video signal processing unit 44, and for outputting the third control signal S3, based on an input from the up/down key, to the video signal processing unit 44; an OSD signal generator 43 for storing, in an internal memory, the second test video signal in which inherent RGB color sensitivity information is included, and for outputting the second test video signal based on the second control signal S2; and a video signal processing unit 44 for synthesizing the first test video signal, inputted from the photographing device 30, based on the second control signal, and the second test video signal inputted from the OSD signal generator 43 for display on a screen, for controlling the amplitude degree based on the third control signal S3, and for amplifying all the video signals inputted from the photographing device 30 based on the adjusted amplitude degree for display on the screen.

Figure 4:
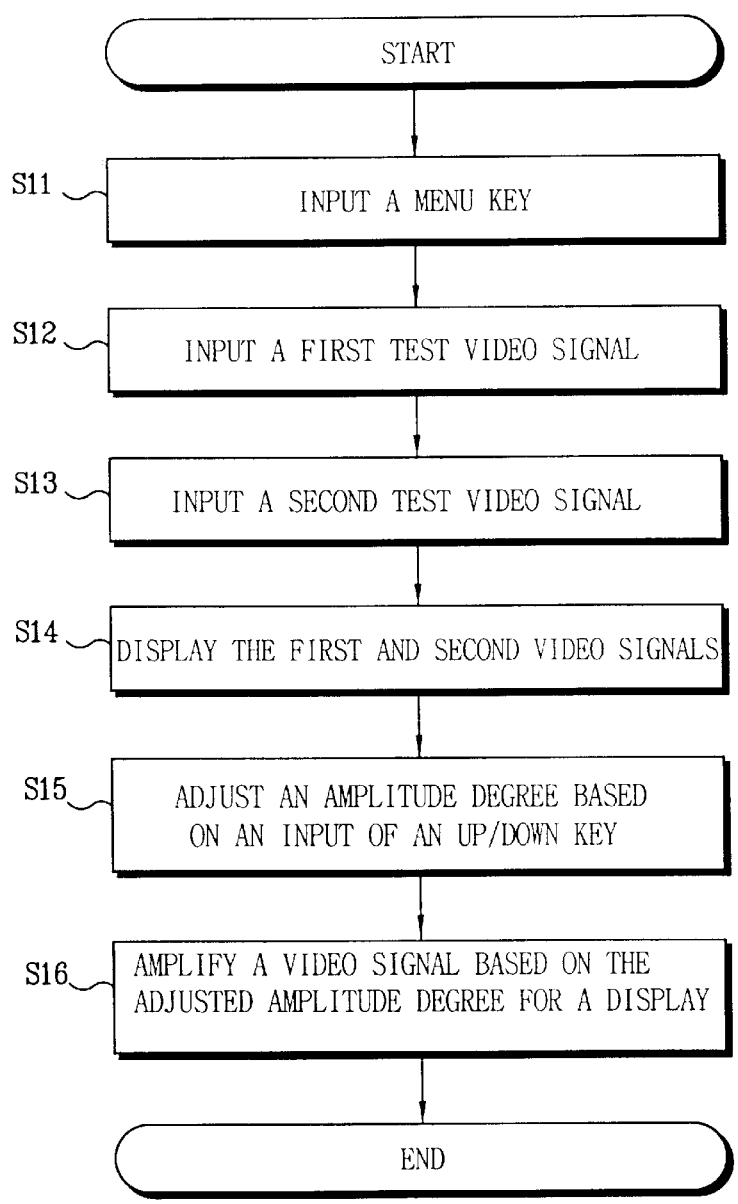
FIG. 4 is a flow chart showing a method for reproducing real colors according to a first embodiment of the present invention.

The video signal processing units 24 and 44 of FIGS. 2 and 4, respectively, generally include a pre-amplifier 26, 46 and a main amplifier 27, 47. The pre-amplifier 26, 46 amplifies a video signal inputted from the video signal generating devices 10' and 30, respectively, according to a certain amplitude degree, amplifies a video signal inputted from the OSD signal generators 23 and 43, respectively, according to a certain amplitude degree, and synthesizes the two amplified video signals for output to the main amplifier 27, 47. Accordingly, the main amplifier 27, 47 amplifies the two video signals synthesized in the pre-amplifier 26, 46 once more for supply to the cathode of the cathode ray tube (CRT) 25, 45.

Operations and effects of the first embodiment of the present invention, as structured above, will be described in detail with reference to FIG. 4, FIG. 5a, and FIG. 5b.

Figure 5A:
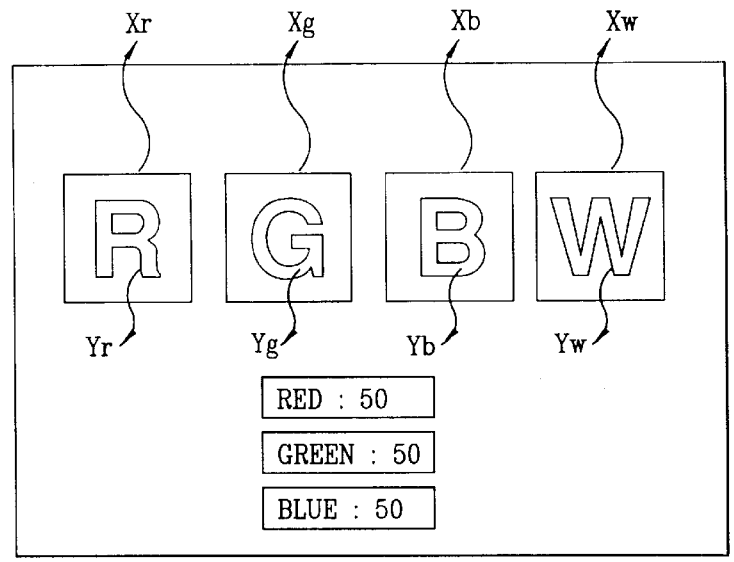
FIG. 5a and FIG. 5b are views showing a display on a screen of a video display device according to an embodiment of the present invention.
Figure 5B:
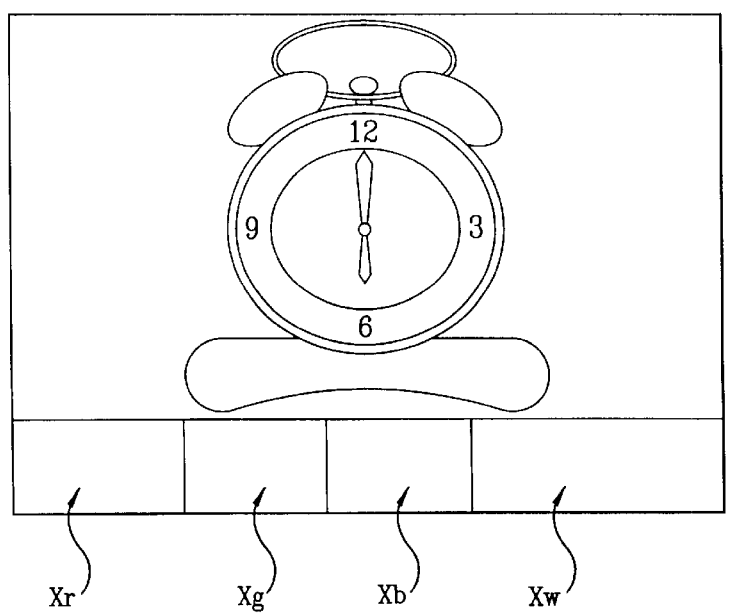

FIG. 4 is a flow chart showing a method for reproducing real colors according to a first embodiment of the present invention, and FIG. 5a and FIG. 5b are views showing a display on a screen of a video display device according to an embodiment of the present invention.

1. First Embodiment

In general, the video signal display device 20 amplifies a video signal inputted from a video signal generating device 10' through transmission lines by a set amplitude degree for display on a screen.

At this time, if a user operates a menu key for reproducing real colors, the display controller 22 senses the input and outputs the first control signal S1 and the second control signal S2 to the video signal generating device 10' and the OSD signal generator 23, respectively (S11).

The video signal generating device 10', based on the first control signal S1 inputted from the video signal display device 20, reads from an internal memory the first test video signal in which inherent RGB color sensitivity information of a video signal generating device is included, and outputs the read first test video signal to the video signal display device 20 (S12).

At this time, the controller 11 and the display controller 22 use the same communication lines as DDC lines to transmit and receive command data to and from each other.

For example, when the video signal generating device 10' is a computer, a program is already built into the video signal generating device 20 to read the first test video signal stored in the internal memory and then to transmit the read first test video signal to the video signal display device 20 with a required resolution if the first control signal S1 is inputted from the video signal display device 20.

That is, if a user operates the menu key, the computer 10' stops an ongoing job, and transmits the first test video signal stored in the internal memory to the video signal processing unit 24 of the video signal display device 20.

In the meantime, the OSD signal generator 23, based on the second control signal S2, reads the second test video signal, in which the inherent RGB color sensitivity information of the OSD signal generator 23 is included, from the internal memory, and then outputs the read second test video signal to the video signal processing unit 24 (S13).

Accordingly, the video signal processing unit 24, based on the second control signal, synthesizes the first and second test video signals for a display on the screen (S14).

For example, as shown in FIG. 5a, let R, G and B video signals of the first test video signal inputted from the video signal generator 12 be Xr, Xg and Xb, respectively, and R, G and B video signals of the second test video signal inputted from the OSD signal generator 23 be Yr, Yg and Yb, respectively.

At this time, the Xr, Xg and Xb display color bar shapes, and the Yr, Yg and Yb display character shapes, so that the character shapes of Yr, Yg and Yb are displayed on the background of the color bar shapes of Xr, Xg and Xb.

Accordingly, the colors of Yr, Yg and Yb inputted from the OSD signal generator 23 are the real colors viewed by the user. Therefore, the user compares the colors of Xr, Xg and Xb with the colors of Yr, Yg and Yb, and adjusts the amplitude degree of the colors of Xr, Xg and Xb until the colors of Xr, Xg and Xb are matched with the colors of Yr, Yg and Yb, respectively.

At this time, as shown in FIG. 5a, by displaying the Yr, Yg, and Yb on the background of the Xr, Xg and Xb, the display on a screen is constructed so that a user can easily distinguish color differences with the naked eye.

Describing the color adjustment process in further detail, the display controller 22 outputs the third control signal S3 when the up/down key is first operated by the user, and the video, signal processing unit 24 controls the amplitude degree based on the third control signal (S15).

Accordingly, the video signal processing unit 24 amplifies the Xr, Xg and Xb video signals inputted from the video signal generating device 10 based on the adjusted amplitude degree for a display on the screen (S16).

For example, if any of the colors of Xr, Xg, and Xb is selected by a user and an increment/decrement command is inputted by the up/down key, the display controller 22 increases/decreases an amplitude degree of the selected color, transmits the increased/decreased amplitude degree to the video signal processing unit 24, and stores the increased/decreased amplitude degree in a memory. Accordingly, the video signal processing unit 24 increases the magnitude of a video signal having the corresponding color based on the increased/decreased amplitude degree.

Further, the Xr, Xg and Xb of the first test video signal and the Yr, Yg and Yb of the second test video signal in FIG. 5a may be interchanged.

At this time, the amplitude degrees of the video signal and the OSD signal, respectively, are adjusted to become maximum according to the present invention. The adjustments of the amplitude degrees are adjustments with respect to how high the RGB maximum value is.

The video signal generating device 10' may be a compact disc player or a video tape player, in addition to a computer.

That is, upon recording a video signal on a video recording medium such as a compact disc or a video tape, information on RGB color sensitivity is recorded for display on the screen for color adjustments when connected to the video signal display device 20.

2. Second Embodiment

In general, the video signal display device 40 amplifies a video signal inputted from the photographing device 30 through transmission lines by a set amplitude degree for display on a screen.

The photographing device 30, according to present invention, detects an RGB color sensitivity from a photographed video signal, produces the first test video signal based on the detected RGB color sensitivity, and synthesizes the photographed video signal and first RGB color information for output.

For example, as shown in FIG. 5b, if the photographing device 30 photographs a clock, the CCD 31 converts an optical signal of the object into an electric signal, the digital signal processor 32 detects the RGB color sensitivity from the video signal inputted from the CCD 31, produces the first test video signal based on the detected RGB color sensitivity, synthesizes the photographed video signal and the produced first test video signal for digital signal processing, stores the digital-signal-processed video signal in the frame memory 33 by frame unit under the control of the photographing controller 34, and transmits the video signal to the video signal display device 40.

At this time, if a user operates the menu key for the reproduction of real colors, the display controller 42 senses the input from the menu key and outputs the second control signal S2 to the OSD signal generator 43.

The OSD signal generator 43, based on the second control signal S2, reads the second test video signal, in which the inherent RGB color sensitivity information of the OSD signal generator 43 is included, from the internal memory, and outputs the read second test video signal to the video signal processing unit 44.

The video signal processing unit 44, based on the second control signal S2, synthesizes the first test video signal and the second test video signal for display on the screen.

As a further example, as shown in FIG. 5a, let R, G and B video signals of the first test video signal inputted from the photographing device 30 be Xr, Xg and Xb, respectively, and let R, G and B video signals of the second test video signal inputted from the OSD signal generator 43 be Yr, Yg and Yb, respectively.

At this time, the Xr, Xg and Xb display color bar shapes, and the Yr, Yg and Yb display character shapes, so that the character shapes of Yr, Yg and Yb are displayed on the background of the color bar shapes of Xr, Xg and Xb, respectively.

Accordingly, the colors of Yr, Yg and Yb inputted from the OSD signal generator 43 are the real colors viewed by the user. Therefore, the user compares the colors of Xr, Xg and Xb with the colors of Yr, Yg and Yb, respectively, and adjusts the amplitude degree of the colors of Xr, Xg and Xb until the colors of Xr, Xg and Xb are matched with the colors of Yr, Yg and Yb, respectively.

At this time, as shown in FIG. 5a, by displaying the Yr, Yg and Yb on the background of the Xr, Xg and Xb, respectively, the display on a screen is constructed so as to enable a user to easily distinguish color differences with the naked eye.

Describing the color adjustment process in further detail, the display controller 42 outputs the third control signal S3 when the up/down key is first operated by the user.

The video signal processing unit 44 amplifies the Xr, Xg and Xb video signals inputted from the photographing device 30 based on the adjusted amplitude degree for display on the screen.

For example, if any of the colors of Xr, Xg and Xb is selected by a user, and the increment/decrement function is commanded by the up/down key, the display controller 42 increases/decreases an amplitude degree of the selected color, transmits the increased/decreased amplitude degree to the video signal processing unit 44, and stores the increased/decreased amplitude degree in a memory. Accordingly, the video signal processing unit 44 increases the magnitude of a video signal having the corresponding color based on the increased/decreased amplitude degree.

Further, the Xr, Xg and Xb of the first test video signal and the Yr, Yg and Yb of the second test video signal in FIG. 5a may be interchanged.

At this time, the amplitude degrees of the video signal and the OSD signal, respectively, are adjusted to become maximum according to the present invention. The adjustments of the amplitude degrees are the adjustments with respect to how high the RGB maximum value is.

Further, the photographing device 30 may be a digital camera or a camcorder.

In the meantime, the application of the second embodiment to a television broadcast will be described below.

Figure 6A:
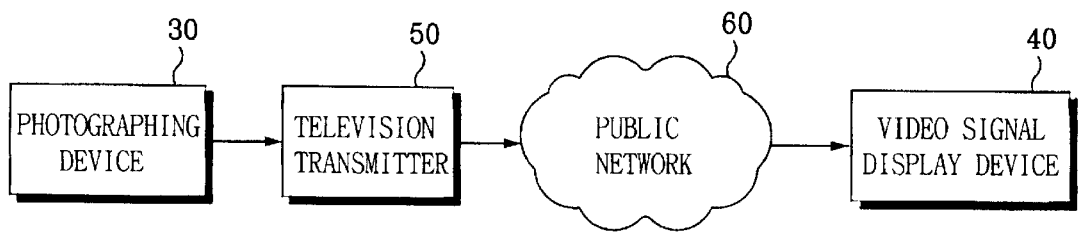
FIGS. 6a and 6b are views for explaining the apparatus of FIG. 3 when applied to a television broadcast.
Figure 6B:
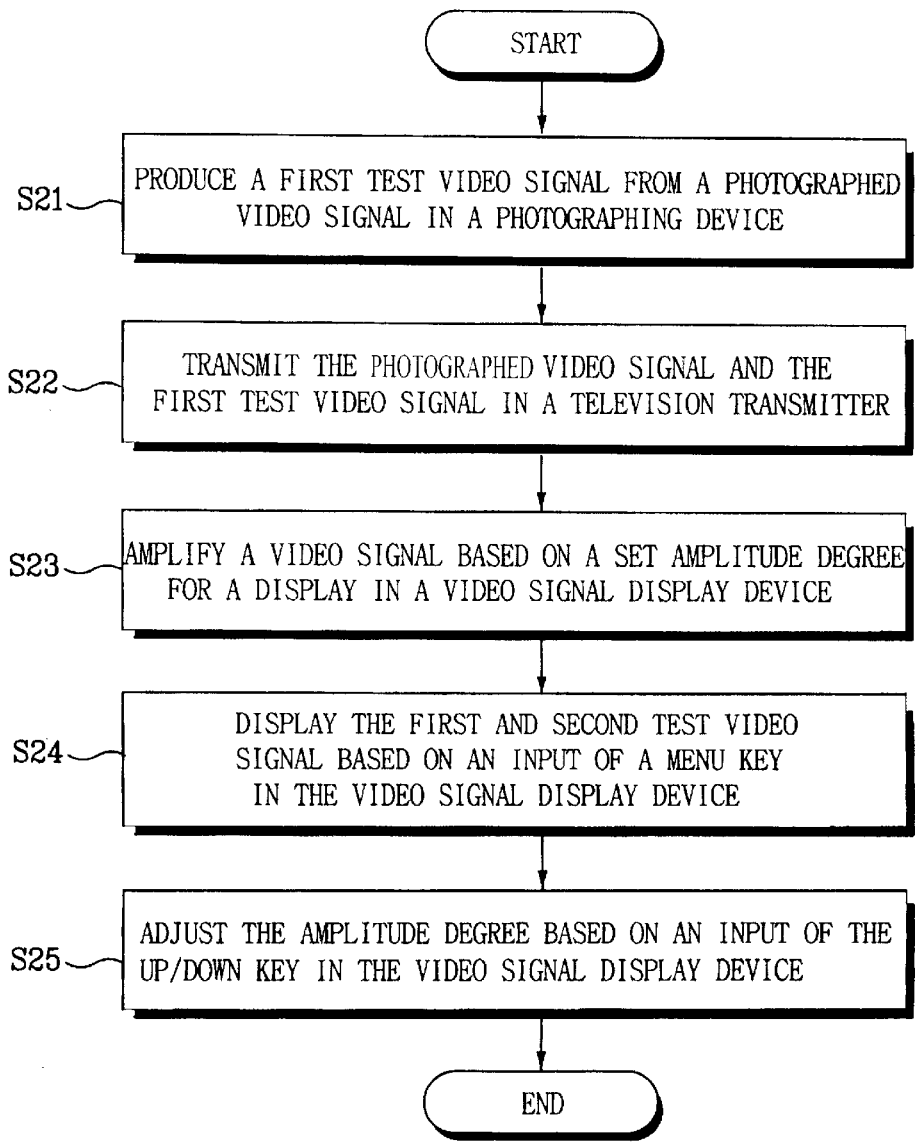

FIGS. 6a and 6b are views explaining the apparatus of FIG. 3 applied to a television broadcast.

First of all, an RGB color sensitivity is detected from a video signal photographed by the photographing device 30, the first test video signal is produced based on the detected RGB color sensitivity, and the photographed video signal and the first test video signal are synthesized so as to be stored frame by frame (S21).

A television transmitter 50 converts the video signal inputted from the photographing device 30 for transmission to a public network 60 through a transmitting antenna (S22).

The video signal display device 40 receives the video signal from the public network 60 through a receiving antenna, separates a photographed video signal and the first test video signal from the received video signal, amplifies the photographed video signal based on the set amplitude degree for a display on the screen, and stores the first test video signal in the internal memory (S23).

When an input from a menu key is received from a user, the video signal display device 40 reads the first test video signal and the second test video signal in which the inherent RGB color sensitivity information of the video signal display device is included, and synthesizes the first and second test video signals for display on the screen (S24).

In the above state, if an input from the up/down key is received from a user, an amplitude, degree is adjusted based on the input of the up/down key input, and all the video signals received through the public network 60 are amplified based on the adjusted amplitude degree for display on the screen (S25).

That is, if the television transmitter 50 outputs the first test video signal together with the television video signal through the public network 60, a user compares the first test video signal (received through the public network 60) and the second test video signal (stored in the video signal display device 40) to each other so that the user can view real colors through the screen.

In the meantime, if the second embodiment is applied to an electronic commerce business, the real colors can be reproduced so that users can receive sufficient help in purchasing goods.

Figure 7A:
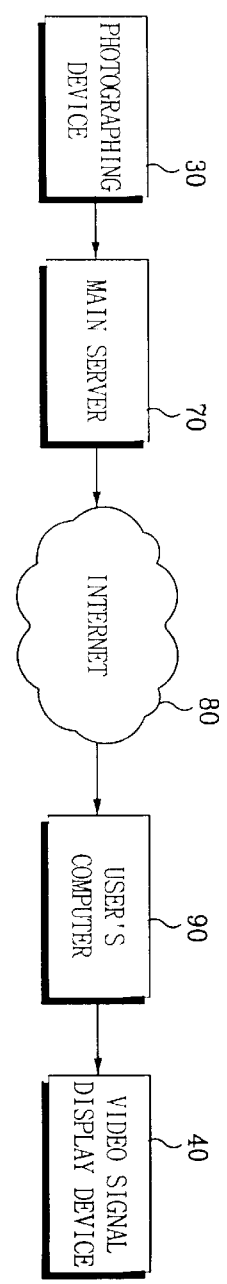
FIGS. 7a and 7b are views for explaining the apparatus of FIG. 3 when applied to an electronic commerce business.
Figure 7B:
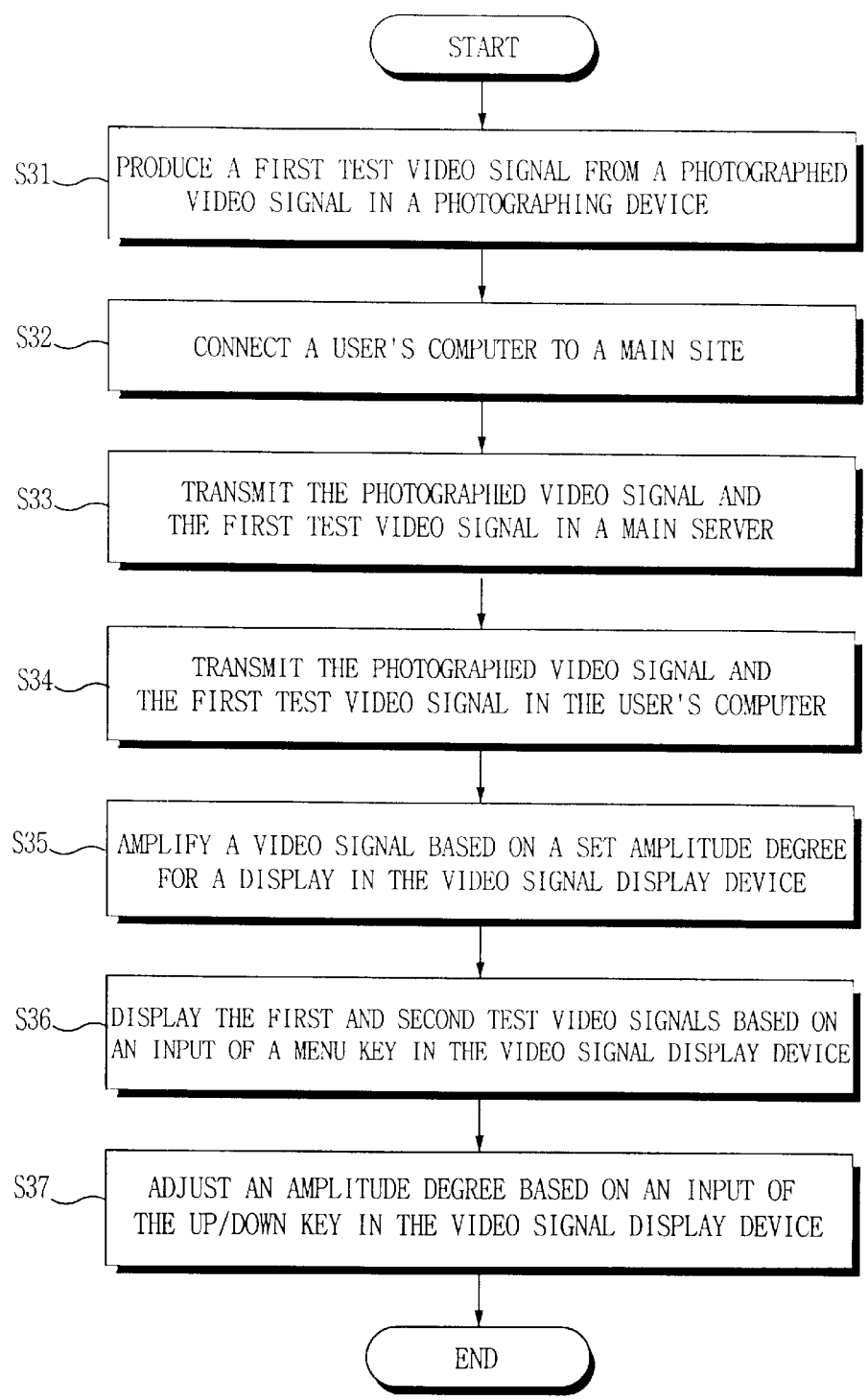

FIGS. 7a and 7b are views explaining the apparatus of FIG. 3 applied to an electronic commerce business.

First of all, the photographing device 30 detects an RGB color sensitivity from a photographed video signal, produces the first test video signal based on the detected RGB color sensitivity, and synthesizes the photographed video signal and the first test video signal for storage frame by frame (S31).

The main server 70 stores the video signal, inputted from the photographing device 30, in a database.

Accordingly, if a user's computer 90 is connected to a web page of a main site through the internet 80 (S32), the video signal is transmitted to the user's computer 90 through the internet 80 from the main server 70 (S33).

At this time, in order for the user to be connected to the main server 70 through the internet 80, a web browser is built into the user's computer 90.

After the web browser built in the user's computer 90 is activated by the user and a domain of the main site is inputted to establish a communication connection with the main server 70, the main server 70 transmits the video signal to the user's computer 90 through the internet 80.

Accordingly, if the user's computer 90 transmits a video signal, received through the internet 80, to the video signal display device 40 (S34), the video signal display device 40 separates a photographed video signal and the first test video signal from the transmitted video signal, amplifies the photographed video signal based on a set amplitude degree for display on the screen, and stores the first test video signal in an internal memory (S35).

At this time, when the menu key is operated by a user, the video signal display device 40 reads, from the internal memory, the first test video signal and the second test video signal, in which the inherent RGB color sensitivity of a video signal display device is included, and synthesizes the first and second test video signals for display on the screen (S36).

In this state, when the menu key is operated by a user, the video signal display device 40 adjusts an amplitude degree in accordance with an input from the up/down key, and amplifies all the video signals received through the internet 80, based on the adjusted amplitude degree, for display on the screen (S37).

That is, when the main server 70 transmits the first test video signal, together with a video signal relating to goods, through the internet 80 to the user's computer 90, the user can compare the first test video signal received through the internet 80 with the second test video signal stored in the video signal display device 40, and can view the real colors of the goods through the screen.

As described above, the present invention compensates for various color distortions which can be generated until a video signal, outputted from the video signal generating device 10' or the photographing device 30, is finally displayed on the screen of the video signal display device 20 or 40. In this way, the real colors of images displayed on the screen can be reproduced upon performing electronic commerce business or doing design jobs which require precision.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for reproducing real colors in a video system, comprising:

a video signal generating device for storing a first test video signal in which inherent RGB color sensitivity information thereof is included, and for providing the first test video signal as an output; and a video signal display device for storing a second test video signal in which inherent RGB color sensitivity information thereof is included, for synthesizing the first test video signal and the second test video signal based on a request of a user for display on a screen, for adjusting an amplitude degree of the first test video signal until color sensitivity of the first test video signal matches color sensitivity of the second test video signal, and for amplifying all video signals from the video signal generating device based on the adjusted amplitude degree for display on the screen;

wherein said video signal display device includes:
a key input unit operable by the user;
a display controller for outputting first and second control signals based on inputs from said key input unit;
an OSD signal generator for storing the second test video signal in which the inherent RGB color sensitivity is included, and for outputting the second test video signal based on the first control signal; and
a video signal processing unit for synthesizing the first and second test video signals for display on the screen based on the first control signal, for adjusting the amplitude degree based on the second control signal, and for amplifying all video signals from the video signal generating device based on the adjusted amplitude degree for displaying on the screen.

2. The apparatus as claimed in claim 1, wherein the key input unit is equipped with a menu key and an up/down key; and
wherein the display controller outputs the first control signal based on an input from the menu key, and outputs the second control signal based on an input from the up/down key.

3. The apparatus as claimed in claim 2, wherein the video signal generating device includes:
a controller for outputting a third control signal; and
a video signal generator for generating a certain video signal, for storing the first test video signal in which the inherent RGB color sensitivity information thereof is included, and for outputting the first test video signal to the video signal display device based on the third control signal.

4. The apparatus as claimed in claim 1, wherein the video signal generating unit comprises one of a computer, a compact disc player, and a video tape player.

5. In a video system having a video signal display device for amplifying a certain video signal inputted from a video signal generating unit for display on a screen based on a set amplitude degree, a method for reproducing real colors of the video system, said method comprising steps of:
outputting a control command when the video signal display device receives an input from a menu key operated by a user;
outputting to the video signal display device a first test video signal, in which inherent RGB color sensitivity information of the video signal display device is included, based on the outputted control command;
reading from an internal memory a second test video signal, in which inherent RGB color sensitivity information of the video signal display device is included, based on the outputted control command;
synthesizing the first test video signal and the second test video signal for display on a screen in the video signal display device;
adjusting an amplitude degree in accordance with an input from an up/down key when the up/down key is operated by the user during the display of the synthesizing step; and
amplifying all video signals from the video signal generating device based on the adjusted amplitude degree for display on the screen.

6. An apparatus for reproducing real colors of a video system, comprising:
a photographing device for detecting an RGB color sensitivity from a photographed video signal, for producing a first test video signal based on the detected RGB color sensitivity, and for synthesizing the photographed video signal and the first test video signal for an output; and
a video signal display device for storing a second test video signal in which inherent RGB color sensitivity information thereof is included, for synthesizing the first test video signal and the second test video signal for display on a screen based on a request of a user, for adjusting an amplitude degree of the first test video signal until a color sensitivity of the first test video signal is the same as a color sensitivity of the second test video signal, and for amplifying all video signals from the photographing device based on the adjusted amplitude degree for display on the screen;

wherein said video signal display device includes:
a key input unit operable by the user;
a display controller for outputting first and second control signals based on inputs from said key input unit;
an OSD signal generator for storing the second test video signal in which the inherent RGB color sensitivity is included, and for outputting the second test video signal based on the first control signal; and
a video signal processing unit for synthesizing the first and second test video signals for display on the screen based on the first control signal, for adjusting the amplitude degree based on the second control signal, and for amplifying all video signals from the video signal generating device based on the adjusted amplitude degree for displaying on the screen.

7. The apparatus as claimed in claim 6, wherein the photographing device includes:
a charge coupled device (CCD) for converting an optical signal into an electric signal;
a digital signal processor for detecting the RGB color sensitivity from the electric signal from the charge coupled device, for producing the first test video signal based on the detected RGB color sensitivity, and for synthesizing the photographed video signal and the first test video signal to produce a digital processed video signal;
a frame memory for storing the digital processed video signal by a frame unit; and
a photographing controller for controlling the CCD, the digital signal processor and the frame memory.

8. The apparatus as claimed in claim 6, wherein the key input unit is equipped with a menu key and an up/down key; and
wherein the display controller outputs the first control signal based on an input from the menu key, and outputs the second control signal based on an input from the up/down key.

9. The apparatus as claimed in claim 6, wherein the photographing device comprises one of a digital camera and a digital camcorder.

10. The apparatus as claimed in claim 6, wherein the photographing device and the video signal display device transmit and receive data by means of a public television network.

11. The apparatus as claimed in claim 6, wherein the photographing device and the video signal display device transmit and receive data by means of an internet.

12. A method for reproducing real colors of a video system, comprising the steps of:

detecting an RGB color sensitivity from a photographed video signal, producing a first test video signal based on the detected RGB color sensitivity, and synthesizing the photographed video signal and the first test video signal to produce a video signal for storage frame by frame in a photographing device;

converting the video signal stored in the photographing device, and transmitting the converted video signal to a public network through a transmitting antenna in a television transmitter;

receiving the converted video signal from the public network through a receiving antenna, separating the photographed video signal and the first test video signal from the received converted video signal, amplifying the photographed video signal for display on a screen based on a set amplitude degree, and storing the first test video signal in a video signal display device;

when a menu key is operated by a user, reading a second test video signal, in which inherent RGB color sensitivity information of the video signal display device is included, and the first test video signal stored in the video signal display device, and synthesizing the first test video signal and the second test video signal for display on the screen; and when an up/down key is operated by the user, adjusting the amplitude degree based on an input from the up/down key, and amplifying all video signals received through the public network based on the adjusted amplitude degree for display on the screen in the video signal display device.

13. A method for reproducing real colors of a video system, comprising the steps of:

detecting an RGB color sensitivity from a photographed video signal, producing a first test video signal based on the detected RGB color sensitivity, and synthesizing the photographed video signal and the first test video signal to produce a video signal for storage frame by frame in a photographing device;

connecting a computer of a user to a web page of a main site through an internet;

converting the video signal stored in the photographing device for transmission to the computer of the user through the internet;

transmitting the converted video signal received through the internet to a video signal display device in the computer of the user;

receiving the converted video signal from the computer of the user, separating the photographed video signal and the first test video signal from the received converted video signal, amplifying the photographed video signal based on a set amplitude degree for display on a screen, and storing the first test video signal in the video signal display device;

when a menu key is operated by a user, reading a second test video signal, in which inherent RGB color sensitivity information of the video signal display device is included, and the first test video signal stored in the video signal display device, and synthesizing the first test video signal and the second test video signal for display on the screen; and when an up/down key is operated by the user, adjusting the amplitude degree based on an input from the up/down key, and amplifying all video signals received through the internet based on the adjusted amplitude degree for display on the screen in the video signal display device.

14. The apparatus as claimed in claim 1, wherein the key input unit is operable by the user for adjusting the amplitude degree of the first test video signal.

15. The apparatus as claimed in claim 14, wherein the key input unit includes an up/down key which is operable by the user for adjusting the amplitude degree of the first test video signal.

16. The apparatus as claimed in claim 1, wherein the key input unit includes a menu key which is operable by the user for generating and synthesizing the first and second test video signals.

17. The apparatus as claimed in claim 6, wherein the key input unit is operable by the user for adjusting the amplitude degree of the first test video signal.

18. The apparatus as claimed in claim 17, wherein the key input unit includes an up/down key which is operable by the user for adjusting the amplitude degree of the first test video signal.

19. The apparatus as claimed in claim 6, wherein the key input unit includes a menu key which is operable by the user for generating and synthesizing the first and second test video signals.

* * * * *